E. KRAFT.
Beer-Cooler.
No. 134,208.  Patented Dec. 24, 1872.
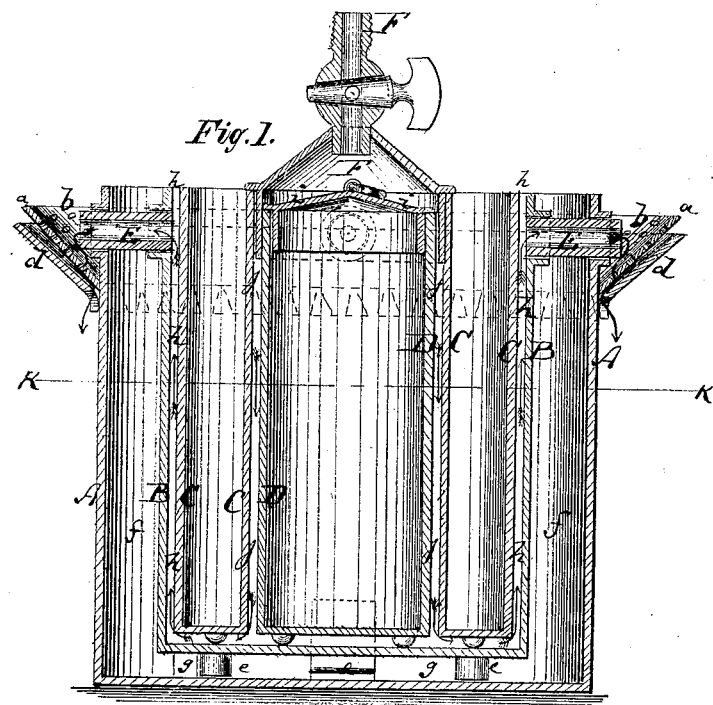
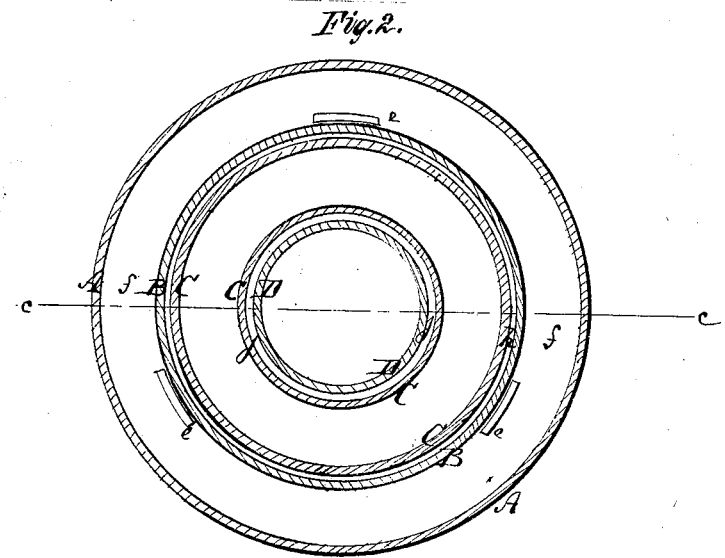
Witnesses:
P. C. Dieterich
Geo. W. Mabee
Inventor:
E. Kraft
per
Attorneys.

UNITED STATES PATENT OFFICE.

EDWARD KRAFT, OF TYRONE, PENNSYLVANIA.

IMPROVEMENT IN BEER-COOLERS.

Specification forming part of Letters Patent No. 134,208, dated December 24, 1872.

*To all whom it may concern:*

Be it known that I, EDWARD KRAFT, of Tyrone, in the county of Blair and State of Pennsylvania, have invented a new and Improved Beer-Cooler, of which the following is a specification:

Figure 1 represents a vertical central section of my improved beer-cooler, the line $c\ c$, Fig. 2, indicating the plane of section. Fig. 2 is a horizontal section of the same on the line $k\ k$, Fig. 1.

Similar letters of reference indicate corresponding parts.

This invention relates to a new arrangement of beer-cooler, having for its object to obtain with the least possible outlay and amount of apparatus the largest practicable amount of cooling-surface. The invention consists in a new arrangement of cylindrical and annular vessels, as hereinafter more fully described.

A in the drawing represents the outer vessel of the cooler. It is of cylindrical form, and of suitable size. Around its top is formed a perforated inclined flange, $a$, forming an annular trough, $b$. The flange $a$ is surrounded by a ring, $d$, which has a serrated lower edge that bears tight against the outer face of the cylinder A. B is a cylindrical vessel, smaller in diameter than A, and somewhat shorter than the same. It is, by short legs or blocks $e\ e$, supported above the bottom of the cylinder A, when placed concentrically therein, as shown, and forms thus an annular space, $f$, around and a circular space, $g$, under itself. C is an annular vessel nearly, but not quite, as high as B, its outer diameter but very little smaller than the space within B. It is also slightly elevated above the bottom of B, as shown. D is the innermost vessel, of cylindrical form, nearly as high as, but somewhat smaller in diameter than the inner part of the vessel C. It is also slightly raised above the bottom of B, as shown. E E are short pipes connecting the very narrow space $h$ between the vessels B and C, at the upper part, with the trough $b$. The vessel D, the vessel C, and the spaces $f\ g$ are to be filled with ice and water or other cooling material.

The beer to be cooled is, in a pipe, F, conducted upon the closed top $i$ of the vessel D, and flows thence down into the narrow space, $j$, which is left between the vessels C and D. In this space the beer is exposed to the cooling-surface of D and the inner wall of C. Flowing thence under C to the space $h$, the beer is therein spread into a still thinner sheet than what it was within $j$, and is exposed to the outer cooling-surface of C and that of B. From the upper part of the space $h$ the beer is, in the pipes E E, conducted to the trough $b$, flowing through the perforations of the same, and between the teeth of the ring $d$, down along the outer side of the vessel A, in a very thin film, and being thus finally exposed to the largest cooling-surface. In this apparatus, therefore, the beer is successively brought in contact and in gradually reduced thickness of sheet with the several cooling-surfaces, which are made of sheet metal or other convenient material.

Having thus described my invention, I claim as new and desire to secure by Letters Patent—

The vessel A, having tubes E, perforated flange $a$, trough $b$, and ring $d$, combined with the vessels B C D forming ice and beer spaces, and all operating as and for the purpose described.

EDWARD KRAFT.

Witnesses:
 WM. VOGT,
 JOSEPH ESCHBACH.